(12) United States Patent
Bytheway et al.

(10) Patent No.: US 10,072,957 B2
(45) Date of Patent: Sep. 11, 2018

(54) MULTI-DIRECTIONAL CAPACITIVE FLOW SENSOR

(71) Applicant: CIRQUE CORPORATION, Salt Lake City, UT (US)

(72) Inventors: Jared G. Bytheway, Sandy, UT (US); J. Douglas Moore, Salt Lake City, UT (US); Ethan Sturm, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 15/643,360

(22) Filed: Jul. 6, 2017

(65) Prior Publication Data

US 2018/0010937 A1    Jan. 11, 2018

Related U.S. Application Data

(60) Provisional application No. 62/359,138, filed on Jul. 6, 2016.

(51) Int. Cl.
*G01F 1/38* (2006.01)
*G01B 7/16* (2006.01)

(52) U.S. Cl.
CPC ............. *G01F 1/383* (2013.01); *G01B 7/18* (2013.01)

(58) Field of Classification Search
CPC ........................................................ G01F 1/38
See application file for complete search history.

(56) References Cited

U.S. PATENT DOCUMENTS

| | | | | |
|---|---|---|---|---|
| 7,055,384 B2 * | 6/2006 | Williams | ................ | G01F 23/04 33/722 |
| 7,188,521 B2 * | 3/2007 | Fling | ..................... | G01F 23/543 73/305 |
| 7,231,821 B2 * | 6/2007 | Fling | ..................... | G01F 23/543 73/314 |
| 7,827,863 B2 * | 11/2010 | Kurth | ...................... | G01F 23/02 73/324 |
| 7,836,760 B2 * | 11/2010 | Saylor | ................... | G01D 9/005 73/195 |
| 8,857,674 B2 * | 10/2014 | Nighy | .................. | B67D 1/0078 222/275 |
| 8,928,864 B2 * | 1/2015 | Brungardt | ............ | G01F 23/284 356/5.01 |
| 8,966,972 B2 * | 3/2015 | Perten | .................. | G01F 23/268 73/290 R |

* cited by examiner

*Primary Examiner* — Jewel V Dowtin
(74) *Attorney, Agent, or Firm* — Parsons Behle & Latimer

(57) ABSTRACT

A system and method for providing a fluid flow strain gauge that may be mounted inside a pipe and connected to a base unit that uses capacitive or resistive technology to determine a direction and a rate of flow of a fluid through the pipe by measuring the force applied to the strain gauge by the flow of fluid.

16 Claims, 6 Drawing Sheets

MULTI-DIRECTIONAL CAPACITIVE FLOW SENSOR

BACKGROUND OF THE INVENTION

Field of the Invention

This invention relates generally to flow sensors that are capable of being disposed within a pipe that contains flowing liquid. Specifically, the invention pertains to an improved flow sensor that uses a capacitive or resistive sensor to determine a direction of flow of a liquid within a pipe.

Description of Related Art

There are several designs for capacitive flow sensors which may be used in the present invention. It is useful to examine the underlying technology of the touch sensors to better understand how any flow sensor may take advantage of capacitance technology to provide the desired functionality.

The CIRQUE® Corporation touch sensor is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24.

Although the CIRQUE® touchpad described above uses a grid of X and Y electrodes 12, 14 and a separate and single sense electrode 16, the sense electrode may be the X or Y electrodes 12, 14 by using multiplexing.

It should be understood that use of the term "capacitive flow sensor" throughout this document may be used interchangeably with "touch sensor", "capacitive touch sensor" and "capacitive sensor".

BRIEF SUMMARY OF THE INVENTION

In a first embodiment, the present invention is a system and method for providing a fluid flow strain gauge that may be mounted inside a pipe and connected to a base unit that uses capacitive or resistive technology to determine a direction and a rate of flow of a fluid through the pipe by measuring the force applied to the strain gauge by the flow of fluid.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

There is a need for a smart, low cost and easy to use fluid flow sensor for residential irrigation applications to monitor water usage. However, the principles of the first embodiment of the invention may be extended to any application wherein fluid flow is measured, and therefore should be considered to be applicable to any fluid flow scenario.

One purpose of monitoring water usage is to make a user more aware of usage for conservation purposes. In other words, if accurate measurements of fluid flow can be determined, then the user may make knowledgeable adjustments. Another purpose is to mitigate leaks and failures that cause waste, erosion and expensive damage to other property.

Accordingly, with a reliable fluid flow sensor installed in a smart irrigation system and that is connected to the internet, the fluid flow sensor becomes a powerful and useful player in the internet of things (IOT).

The first embodiment of the fluid flow sensor of the present invention may take advantage of currently available low cost parts that are in high volume production and use them as components in an accurate fluid flow sensor for an irrigation system.

Figure 1:
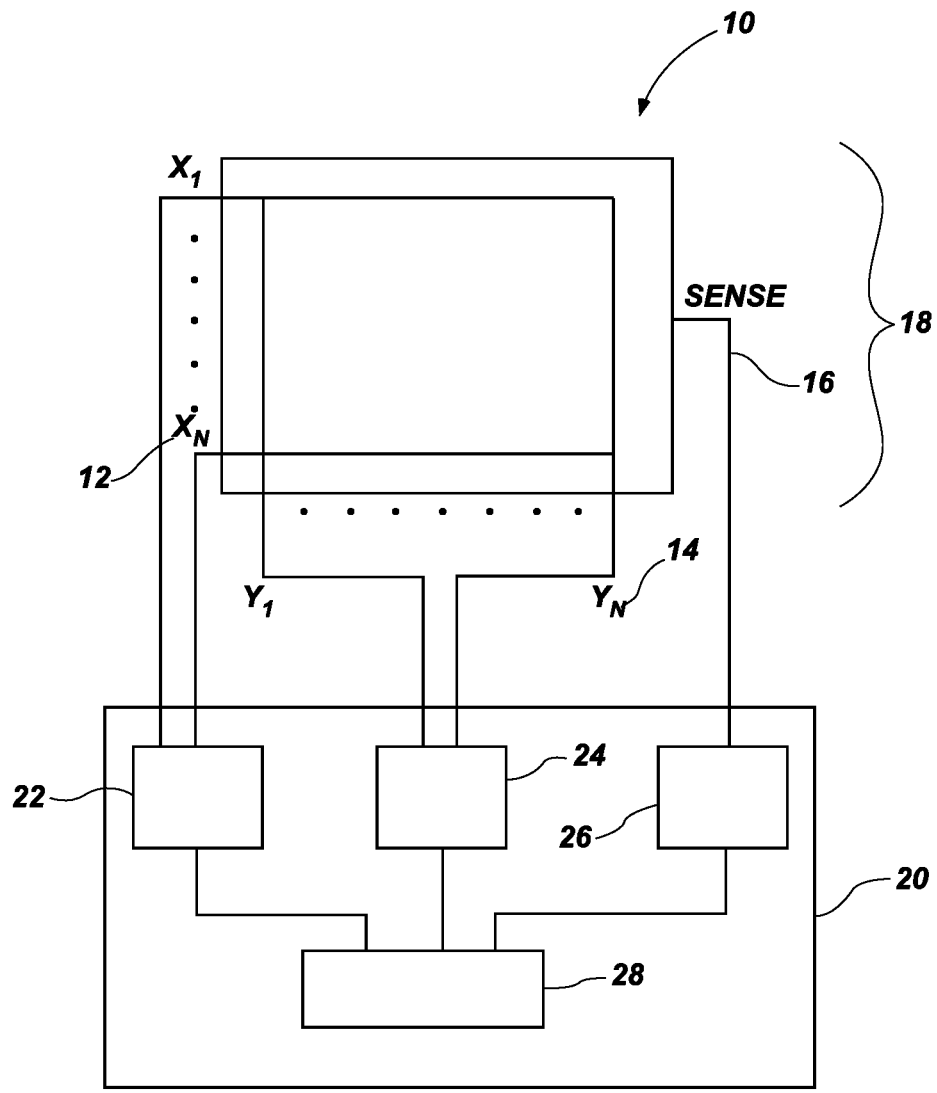
FIG. 1 is a block diagram of operation of a touchpad that is found in the prior art, and which is adaptable for use in the present invention.
Figure 2:
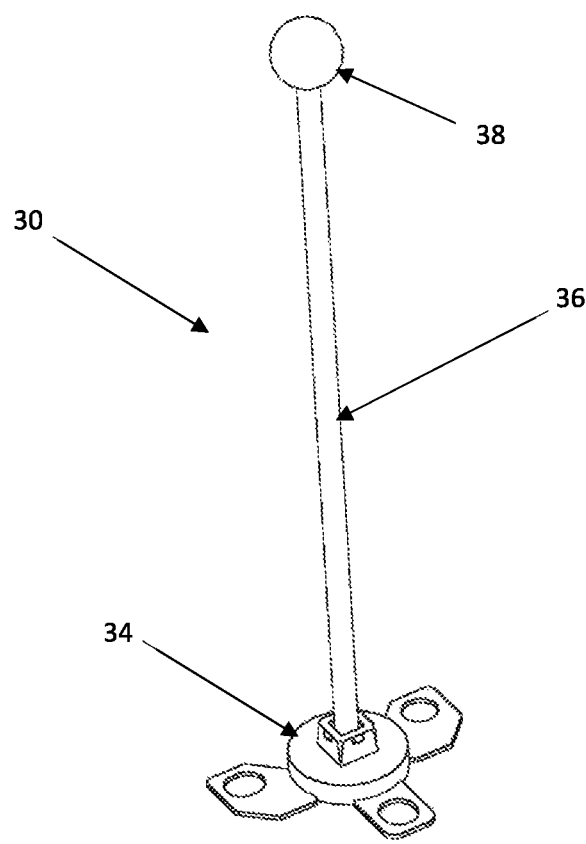
FIG. 2 is a perspective view of the core of a flow sensor having a base that holds a strain gauge, a shaft and a drag element at the end of the shaft.

FIG. 1 is a perspective view of a fluid flow sensor 30 that may be comprised of a strain gauge (not shown) mounted on the underside of a base unit 34. The base unit 34 may be comprised of any suitable material that may protect the strain gauge when in use.

The base unit may include a shaft 36. The shaft may be a detachable/replaceable component as shown, or it may be manufactured as an integrated component of the base unit 34. The shaft 36 is shown in FIG. 1 as a detachable component which is inserted into and secured to the base unit 34.

The shaft 36 may be of sufficient length that it may terminate in the flow of a fluid. Ideally, the fluid flow is substantially perpendicular to the shaft 36 when the shaft is at rest and no force is being applied by the fluid to the shaft. However, the fluid flow strain gauge 30 may still operate even when the fluid flow is not substantially perpendicular to the shaft 36.

It should be understood that if the shaft 36 is able to deflect a maximum distance from a rest position when the fluid flow is at a maximum rate of flow, then the overall accuracy of the fluid flow strain gauge 30 may be maximized.

The shaft 36 may include a drag element 38 at the end of the shaft that terminates in the fluid flow. The drag element 38 may be of any shape that may impede the flow of fluid past the fluid flow strain gauge 30 in order to maximize the deflection of the shaft 36 caused by the fluid flow.

However, it should be understood that the maximum deflection of the shaft 36 should only occur when the fluid flow is also at a maximum. If the fluid flow can cause maximum deflection of the shaft 36 at any rate of flow that is less than maximum, then the strain gauge may fail to accurately measure the rate of fluid flow if the shaft 36 is incapable of further deflection for a range of fluid flow rates.

Figure 3:
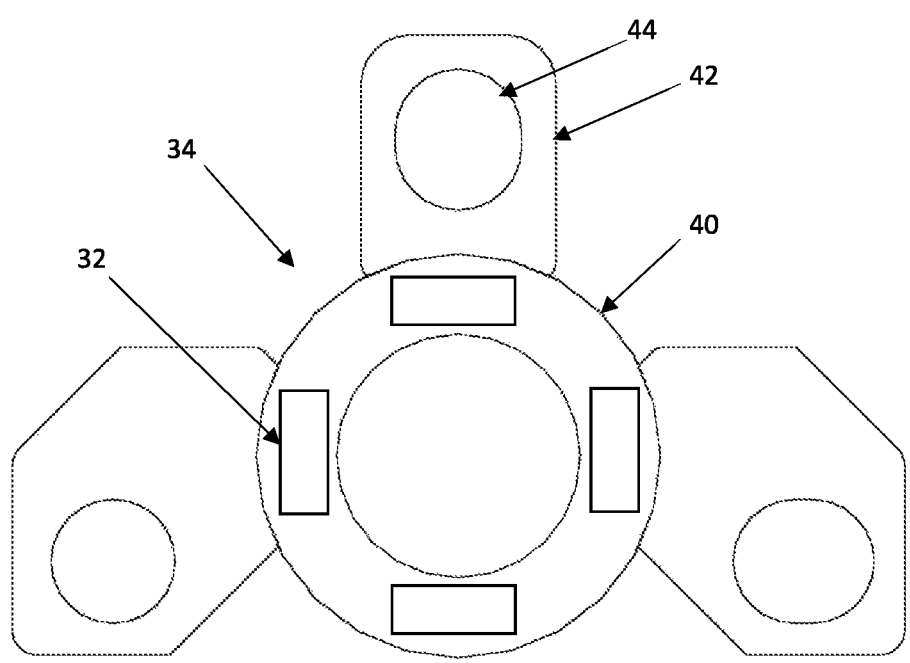
FIG. 3 is a bottom view of the sensor base where the four strain gauge sensor elements are shown mounted on the sensor base.

FIG. 3 is a bottom view of the base unit 34 wherein four strain gauge sensor elements 32 are shown disposed on a ring structure 40. The base unit 34 may be attached to a surface using the tabs 42. A screw may be disposed through a hole 44 in the tabs 42. The number of tabs 42 may be increased or decreased as long as there are a sufficient number to securely hold the fluid flow strain gauge 30.

Figure 4:
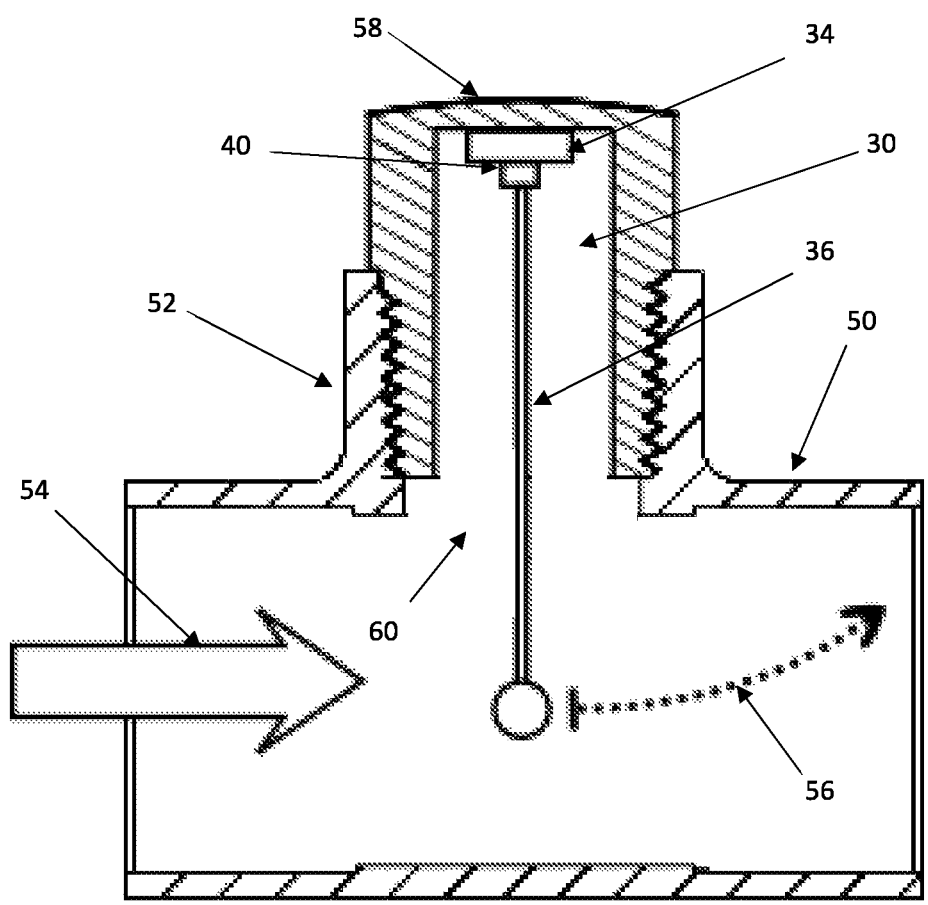
FIG. 4 is a profile cut-away view of the full sensor assembly in the pipe, wherein water flow is shown with large arrow and the resulting shaft torque is shown with the dotted arrow.

FIG. 4 shows that the fluid flow strain gauge 30 may be mounted in a fluid pipe 50 or preferably in a side compartment (a T-section) 52 of a fluid pipe wherein just the end of the shaft 36 with the drag element 38 may protrude into approximately a center of the fluid pipe where the fluid flow may be at a highest velocity.

The housing to which the strain gauge is coupled may be an injection molded PVC end cap assembly 58 that may be screwed onto a standard reducer TEE fitting 52.

As fluid flows through the pipe in the direction indicated by arrow 54, the fluid pushes on the shaft 36 and the drag element 38, and may cause a bending or torque of the shaft as indicated by the dotted arcuate line 56. This torque may be transferred to the base unit 34 which may then cause slight movement or strain in the strain gauge sensor elements 32 that may be mounted on the ring structure 40.

In the first embodiment of the invention, the strain gauge sensor elements 32 may be a capacitive-type wherein four piezo sensor elements may be configured in a bridge topology as shown in FIG. 3.

In an alternative embodiment, the strain gauge sensor elements 32 may be the resistive-type with four resistor sensor elements configured in the same bridge topology as is commonly found in laptop computer cursor control sticks.

In all the embodiments, the capacitive or the resistive strain gauge sensor elements 32 may be arranged such that they are evenly distributed around the ring structure 40 of the base unit 34. Consequently, if there is torque in one axis of the shaft 36, then in a first pair of strain gauge sensor elements 32 disposed opposite to each other, one of the sensor elements 32 increases in value while the strain gauge sensor element 32 on the opposite side decreases in value. The other pair of strain gauge sensor elements 32 that are disposed 90 degrees relative to the first pair also operate in this manner.

One of the advantages of the embodiments of the invention is that some of the components of the fluid flow strain gauge 30 are the same components that are used in a cursor stick pointer in a laptop computer. These components are low cost due to years of refinement and very high-volume production.

In all of the embodiments of the invention, an electrical circuit may be connected to the fluid flow strain gauge 30 that measures the difference in pairs of the strain gauge sensor elements 32. The amount of change in capacitance or resistance may be proportional to the rate of fluid flow. Accordingly, it may be necessary to calibrate the strain gauge sensor elements 32 in order to accurately determine the rate of fluid flow.

Application of the embodiments of the fluid flow strain gauge 30 may include being connected to an automated irrigation controller, wherein the automated irrigation controller may determine when there should and shouldn't be fluid flow, and the proper amount. In the case when the measured fluid flow doesn't match what the automated irrigation controller expects, the automated irrigation controller may shut off irrigation valves and send an error message to a user via text, email, siren, lights, phone etc.

In one aspect of the embodiments of the invention, the drag element 38 on the end of the shaft 36 may be used to produce more torque at the base unit 34. The drag element 38 may be relatively small or large depending on desired fluid flow sensitivity. The specific shape of the drag element 38 may be altered to have a particular three-dimensional shape in order to produce the required drag in the fluid flow being measured.

In another aspect of the embodiments of the invention, a feature of the drag element 38 may be that it produces significant drag in the fluid but still causes minimal reduction in the fluid flow volume and the effect of turbulence is minimized. One such drag element 38 may be a flexible ribbon. Like a kite tail, the flexible ribbon may produce drag on the shaft 36 and yet it has very little surface area so it may only minimally block fluid flow. A flexible tail may also provide a way to reduce the effects of turbulence on the fluid flow strain gauge 30 because it may easily move from side to side with turbulence.

Another aspect of the embodiments of the invention may be the location of the fluid flow strain gauge 30. Some prior art teaches strain gauges that are mounted along the length of the shaft. Another advantage of the embodiments of the invention may be that the fluid flow strain gauge 30 may be protected from the flow of the fluid by being mounted under the base unit 34 and not on top of it. Accordingly, FIG. 3 may also show the bottom of the base unit 34 with the strain gauge sensor elements 32 disposed on the underside of the base unit.

In another aspect of the embodiments of the invention, the shaft 36 may be replaced. Shaft 36 replacements may be necessary because of damage, a desire to change sensitivity, a desire to change shaft length, or a desire to change shaft material type.

There may also be advantages for certain design modifications. For example, a longer shaft 36 may produce more torque on the base unit 34. It may also be desirable to replace the shaft 36 with a material that doesn't react chemically with the fluid being measured.

Another aspect of this first embodiment of the invention is that the entire fluid flow strain gauge 30 may be easily replaced by unscrewing the end cap assembly 58 and replacing it with a new end cap assembly.

Another aspect of this first embodiment may be that since the fluid flow strain gauge 30 may be replaced, the orientation may be different when re-installed. Orientation doesn't matter because the fluid flow strain gauge 30 may be sensitive to torque in any polar direction. This feature may also be used to detect reverse or back flow that may be occurring in the fluid system. Back flow in a fluid system may indicate problems that the user may be alerted to.

Another aspect of the first embodiment is that the walls of the fluid pipe 50 may also act as a bending limit for the shaft 36. The opening 60 of the fluid pipe 50 where the shaft 36 protrudes out may be made smaller to limit the movement of the shaft in order to protect the base unit 34 from being damaged from too much torque.

Figure 5:
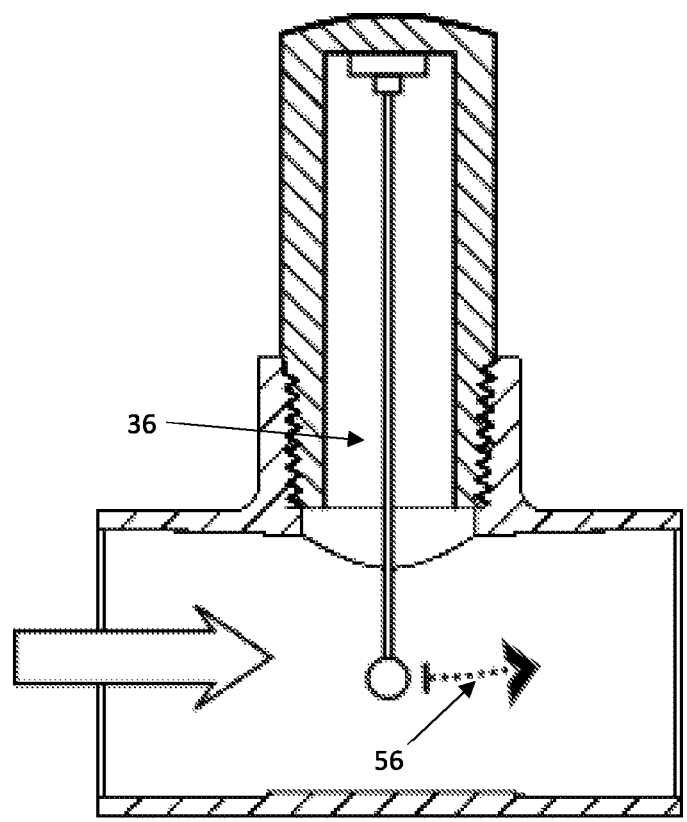
FIG. 5 is similar to FIG. 4 but with a longer shaft.

Alternatively, the length of the shaft 36 may be increased to also limit movement of the shaft as shown in FIG. 5. Thus, because the shaft 36 is longer than in FIG. 4, the total sideways movement as indicated by dotted arcuate line 56 is significantly reduced.

Figure 6:
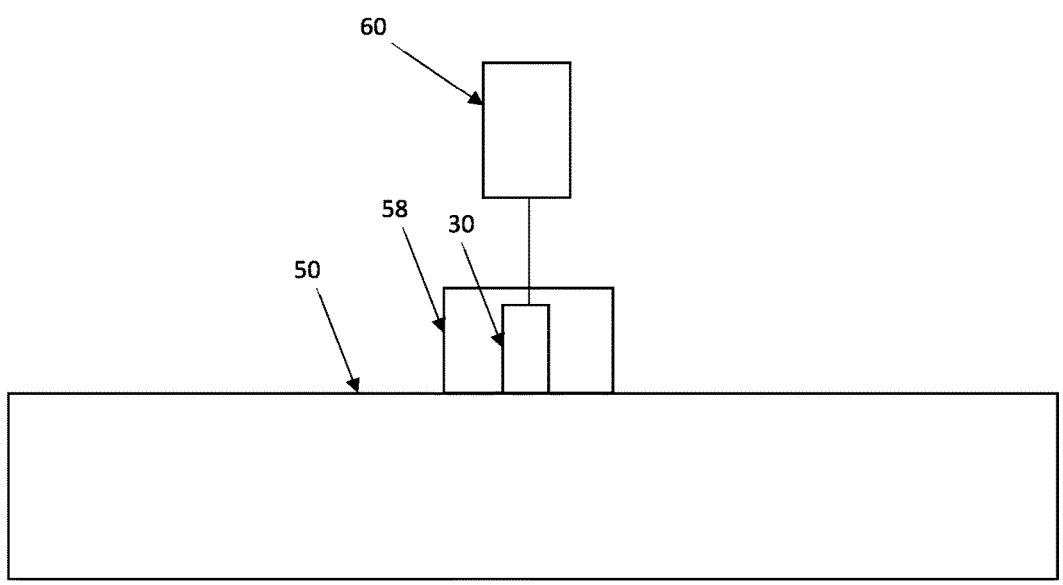
FIG. 6 is a block diagram of the components of the first embodiment of the invention.

FIG. 6 is a block diagram of the components of the first embodiment of the invention, including a pipe 50 or other object through which a fluid may flow, the end cap assembly 58, the fluid flow sensor 30, a controller module 60 for receiving a signal from the fluid flow sensor, and a communication pathway 62 disposed between the fluid flow sensor and the controller module. The controller module 60 may receive signals from the fluid flow sensor 30 and determine the amount of force that is being applied to the shaft 36 of the fluid flow sensor. Alternatively, the fluid flow sensor 30 may include a wireless communication system for transmitting signals to the controller module 60.

In summary, the first embodiment of the invention is a fluid flow sensor system for measuring a rate of flow of a fluid. The system includes a base unit for attaching a fluid flow sensor system to a surface, a plurality of strain gauge sensor elements disposed on the base unit, and a flexible shaft that is coupled at a first end to the base unit, and a second end which extends away from the base unit and into a flow of fluid. The plurality of strain gauge sensor elements are disposed around the flexible shaft such that when a force is applied to the second end, the plurality of strain gauge sensor elements can measure the force applied to the flexible shaft. And finally a a controller module is coupled to the plurality of strain gauge sensor elements for receiving a signal therefrom, and wherein the controller module determines a rate of flow of a fluid from the force that is applied to the flexible shaft.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A fluid flow sensor system for measuring a rate of flow of a fluid, said system comprised of:
   a base unit for attaching a fluid flow sensor system to a surface;
   a plurality of strain gauge sensor elements disposed on the base unit;
   a flexible shaft that is coupled at a first end to the base unit, and a second end which extends away from the base unit and into a flow of fluid, wherein the plurality of strain gauge sensor elements are disposed around the flexible shaft such that when a force is applied to the second end, the plurality of strain gauge sensor elements can measure the force applied to the flexible shaft; and
   a controller module coupled to the plurality of strain gauge sensor elements for receiving a signal therefrom, and wherein the controller module determines a rate of flow of a fluid from the force that is applied to the flexible shaft.

2. The fluid flow sensor system as defined in claim 1 wherein the system further comprises a drag element disposed on the second end of the flexible shaft, wherein the drag element increases the effect of the flow of fluid past the flexible shaft.

3. The fluid flow sensor system as defined in claim 1 wherein the plurality of strain gauge sensor elements is selected from the group of strain gauge sensor elements comprised of capacitance sensor elements and resistive sensor elements.

4. The fluid flow sensor system as defined in claim 3 wherein the system further comprises:
   a ring structure on the base unit that is disposed around the first end of the flexible shaft, wherein the ring structure is distorted when the force is applied to the flexible shaft; and four strain gauge sensor elements disposed equidistantly around the first end of the flexible shaft on the ring structure.

5. The fluid flow sensor system as defined in claim 4 wherein the system further comprises the four strain gauge sensor elements being disposed on a bottom side of the base unit to thereby prevent the fluid from making contact with the strain gauge sensor elements.

6. The fluid flow sensor system as defined in claim 4 wherein the system further comprises the four strain gauge sensor elements being disposed on a top side of the base unit.

7. The fluid flow sensor system as defined in claim 1 wherein the flexible shaft is replaceable.

8. The fluid flow sensor system as defined in claim 1 wherein the fluid flow sensor system further comprises:
   a pipe that enables a fluid to flow therethrough; and
   a side compartment disposed in the pipe, wherein the fluid flow sensor system is disposed in the side compartment and enables the flexible shaft to extend from the side compartment and into the fluid flow of the pipe.

9. A method for measuring a rate of flow of a fluid, said method comprising:
   providing a base unit for attaching a fluid flow sensor system to a surface, a plurality of strain gauge sensor elements disposed on the base unit, a flexible shaft that is coupled at a first end to the base unit, and a second end which extends away from the base unit and into a flow of fluid, wherein the plurality of strain gauge sensor elements are disposed around the flexible shaft, and a controller module coupled to the plurality of strain gauge sensor elements for receiving a signal therefrom;
   inserting the flexible shaft into a fluid flow;
   measuring a force applied to the second end of the flexible shaft using the plurality of strain gauge sensor elements;
   transmitting a signal from the plurality of strain gauge sensor elements to the controller module; and
   determining a rate of flow of a fluid from the force that is applied to the flexible shaft.

10. The method as defined in claim 9 wherein the method further comprises providing a drag element on the second end of the flexible shaft to thereby increase the effect of the flow of fluid past the flexible shaft.

11. The method as defined in claim 9 wherein the method further comprises selecting the plurality of strain gauge sensor elements from the group of strain gauge sensor elements comprised of capacitance sensor elements and resistive sensor elements.

12. The method as defined in claim 11 wherein the method further comprises:
   providing a ring structure on the base unit that is disposed around the first end of the flexible shaft;
   disposing the four strain gauge sensor elements equidistantly around the first end of the flexible shaft on the ring structure; and
   measuring the force applied to the flexible shaft by measuring the strain applied to the four strain gauge sensor elements when the ring structure is distorted by the force applied to the flexible shaft.

13. The method as defined in claim 12 wherein the method further comprises disposing the four strain gauge sensor elements on a bottom side of the base unit to thereby prevent the fluid from making contact with the strain gauge sensor elements.

14. The method as defined in claim 12 wherein the method further comprises disposing the four strain gauge sensor elements on a top side of the base unit.

15. The method as defined in claim 9 wherein the method further comprises temporarily attaching the flexible shaft to the base unit so that it may be replaced when desired.

16. The method as defined in claim 9 wherein the method further comprises:
   providing a pipe that enables a fluid to flow therethrough;
   disposing a side compartment in the pipe and the fluid flow sensor system within the side compartment; and
   extending the flexible shaft from the side compartment and into the fluid flow of the pipe.

\* \* \* \* \*